Nov. 1, 1938.  L. A. SHARLAND  2,135,017
CAPACITY MEASURING INSTRUMENT
Filed Sept. 13, 1935   2 Sheets-Sheet 1
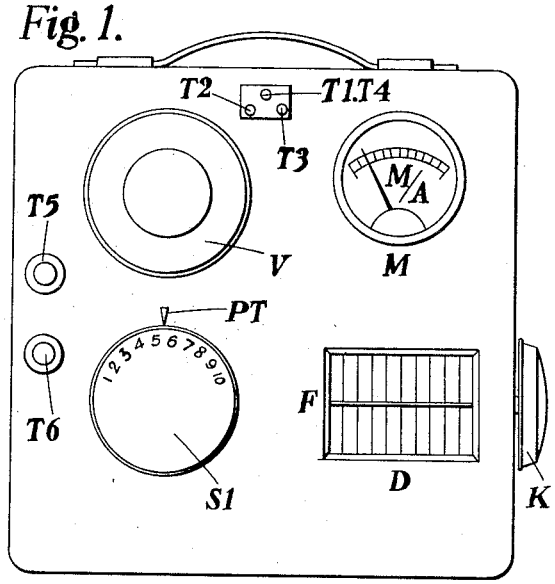
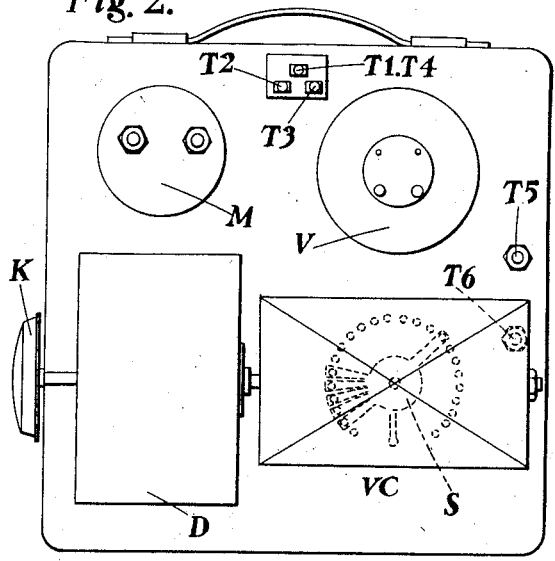
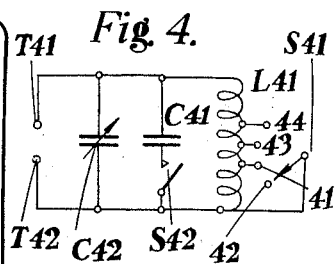
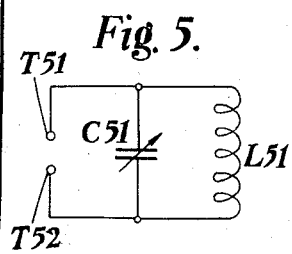
INVENTOR
L. A. Sharland.
BY
Lacey & Lacey
ATTORNEYS

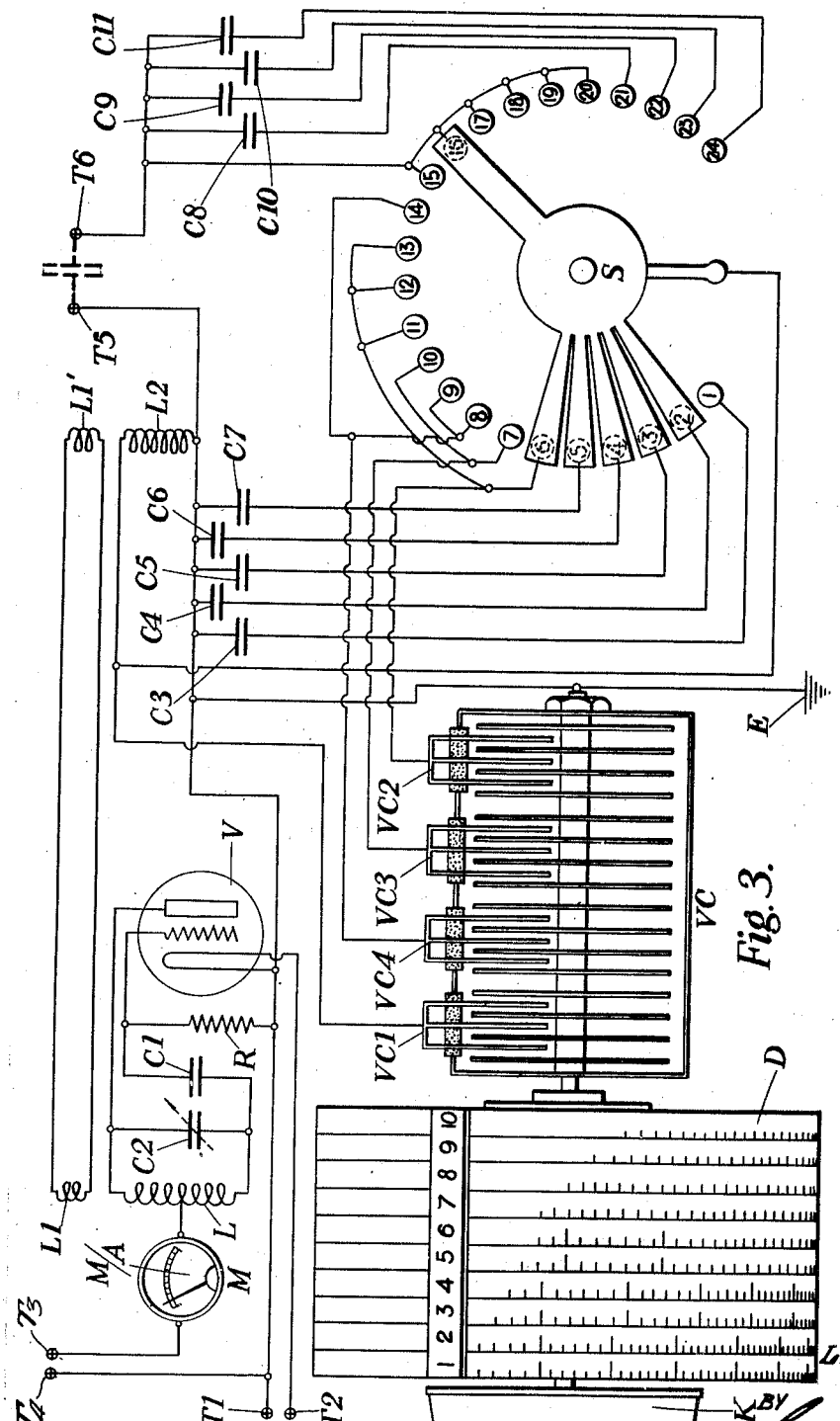

Patented Nov. 1, 1938

2,135,017

UNITED STATES PATENT OFFICE 2,135,017

CAPACITY MEASURING INSTRUMENT

Leonard Arthur Sharland, London, England

Application September 13, 1935, Serial No. 40,512
In Great Britain September 13, 1934

6 Claims. (Cl. 175—183)

This invention relates to the measurement of capacity values, and has for an object to provide improved means for this purpose.

According to the invention an instrument for this purpose comprises an oscillator, a circuit inductively coupled with the oscillator and adapted for the inclusion of a capacity the value of which is to be measured, means for rendering the circuit resonant with the oscillator before the inclusion of the said capacity and for restoring the resonance of the circuit after the insertion of the capacity, and means adapted to indicate the value of the capacity in accordance with the adjustment of the aforesaid means to restore resonance.

For the purpose of the restoration of resonance there are according to one construction provided means for varying the capacity of the circuit as to capacity in parallel with the capacity to be measured or as to capacity in series therewith or in both respects.

For the ascertainment of resonance there are provided means for measuring current flow.

An instrument according to one form of the invention is illustrated by Figures 1 and 2 in front and rear elevation, Figure 2 with the rear cover removed; Figure 3 being a diagram of the electrical connection; and Figures 4 and 5 are diagrams of portions of the circuits of two further instruments in accordance with the invention.

As shown in Figures 1, 2 and 3, an oscillator comprises a thermionic valve V, the anode of which is connected to one end of a coil L having its other end connected through a condenser C1 with the grid, which is also connected through a bias resistance R with a low tension negative terminal T1, whilst the cathode of the valve is connected at one end with the terminal T1 and an earth E and at the other end with a low tension positive terminal T2; a tapping of the coil L is connected through a meter M with a high tension positive terminal T4, the corresponding high tension negative terminal T3 being connected to the low tension negative terminal T1. A condenser C2, is connected across the coil L to enable adjustments to be made when necessary for stray capacities or for small changes in the capacity and inductance values of the oscillator circuit as may be caused by changes of temperature and humidity or atmospheric changes.

The coil L is inductively coupled by means of coils L1 and L1' with a coil L2. It should be understood that the coil L2 may, for the sake of convenience, be inductively coupled with the coil L, thus dispensing with the coupling coils L1 and L1', or simply L1. One end of the coil L2 is connected to a stator VC1 of a four-gang variable condenser VC, the rotor of which is connected to an earth E and to the other end of the coil L2. The last mentioned end of the coil L2 is connected through fixed-capacity condensers C3, C4, C5, C6, and C7 with studs 1, 2, 3, 4, and 5 respectively of a rotary switch S the rotor of which is permanently connected with the other end of the coil L2. The end of the coil L2 which is connected to the fixed condensers C3, C4, C5, C6, and C7 is connected also to one, T5, of two terminals T5 and T6 which are adapted to have connected between them the capacity the value of which is to be measured. The terminal T6 is permanently connected directly with studs 15, 16, 17, 18, 19, and 20 of the switch S, and through fixed-capacity condensers C8, C9, C10, and C11 with studs 21, 22, 23, and 24, respectively, of the switch S. Of the remaining studs of the switch S the stud 7 is permanently connected to the stud 10, the studs 8, 9, and 14 are permanently connected together, and the studs 11, 12, and 13 are permanently connected to the stud 6. The studs 6, 7, and 8 are permanently connected to the stators VC2, VC3, and VC4, respectively, of the variable condenser VC.

The spindle of the switch S extends through the front wall of the instrument and has fast thereon a control knob S1 by means of which the rotor of the switch S can be turned and which is numbered to indicate in conjunction with a pointer PT the various positions of the switch S.

The spindle of the rotor of the variable condenser VC carries an indicating drum D and extends through an end wall of the instrument to a knob K by means of which the drum D and the rotor of the condenser VC can be turned.

Normally the rotor of the switch S is in a position (1) in which its six fingers are, respectively, on the studs 1, 2, 3, 4, 5, and 15; and, as will be seen, the stator VC1 and the fixed capacity condensers C3, C4, C5, C6, and C7 are connected in parallel with one another across the coil L2. The total capacity value thus connected across the coil L2 is in the instrument being described actually 9,000 $\mu\mu f.$ and is such as to produce resonance of the circuit of the coil L2 with the oscillator, and, consequently, the maximum flow of current through the measuring instrument M. When it is desired to measure the value of a capacity, the latter is connected between the terminals T5 and T6 thus putting the circuit of the coil L2 out of resonance; and in order to measure the value of said capacity the variable condenser is adjusted until the capacity of VC thereof is reduced sufficiently to compensate exactly for the added capacity to be measured across the terminals T5 and T6.

The maximum variation of capacity producible by means of each of the stators VC1, VC2, VC3, and VC4 alone by rotating the rotor of the variable condenser VC is slightly over 500 μμf. The values of the fixed condensers C3, C4, C5, C6, and C7 are, respectively, 1,000 μμf., 1,500 μμf., 2,000 μμf., 2,000 μμf., and 2,000 μμf. The values of the fixed condensers C8, C9, C10, and C11 are, respectively, 32,000 μμf., 16,000 μμf., 11,000 μμf. and 9,100 μμf.

For measuring capacities of the following values the procedure is as follows (the capacity in all cases being connected to the terminals T5 and T6):—

Up to 500 μμf.: the rotor of the switch S is set to position (1), and there are thus connected in circuit, in parallel with the capacity to be measured, in addition to the stator VC1 and the rotor of the variable condenser VC, the fixed condensers C3, C4, C5, C6, and C7; the circuit of the coil L2, which has been brought out of resonance with the oscillator by the insertion into the circuit of the capacity to be measured, is now restored to resonance with the oscillator by adjusting the rotor of the variable condenser VC by means of the knob K until the meter M again indicates maximum current, and the value of the capacity to be measured is read off from column 1 of the drum D, which is calibrated to indicate amounts from 0 to 500 μμf., the zero being initially opposite to a rectilinear mark F (Figure 1).

Between 500 μμf. and 1,500 μμf.: the rotor of the switch S is placed in a position (2), in which its fingers are in contact, respectively, with the studs 2, 3, 4, 5, 6, and 16 so that there are connected in circuit, in parallel with the capacity to be measured, the stators VC1 and VC2 and rotor of the variable condenser VC and the fixed condensers C4, C5, C6 and C7 (the fixed condenser C3 being cut out of circuit); the circuit of the coil L2 is as before restored to resonance by means of the knob K, the range of adjustment being in this case 1,000 μμf. owing to the inclusion in circuit of two stators VC1 and VC2; and the value of the capacity to be measured is read off from column 2 of the drum D, which is calibrated to indicate amounts from 500 μμf. to 1,500 μμf.

Between 1,500 μμf. and 3,000 μμf.: the rotor of the switch S is placed in a position (3), in which its fingers are in contact, respectively, with the studs 3, 4, 5, 6, 7, and 17 so that there are connected in circuit, in parallel with the capacity to be measured, the stators VC1, VC2, and VC3 and rotor of the variable condenser VC and the fixed condensers C5, C6, and C7 (the fixed condensers C3 and C4 being cut out of circuit); the circuit of the coil L2 is as before restored to resonance by means of the knob K, the range of adjustment being in this case 1,500 μμf. owing to the inclusion in circuit of three stators VC1, VC2, and VC3; and the value of the capacity to be measured is read off from column 3 of the drum D, which is calibrated to indicate amounts from 1,500 μμf. to 3,000 μμf.

Between 3,000 μμf. and 5,000 μμf.: the rotor of the switch S is placed in a position (4), in which its fingers are in contact, respectively, with the studs 4, 5, 6, 7, 8, and 18 so that there are connected in circuit, in parallel with the capacity to be measured, all the stators and the rotor of the variable condenser VC and the fixed condensers C6 and C7 (the fixed condensers C3, C4, and C5 being cut out of circuit); the circuit of the coil L2 is as before restored to resonance by means of the knob K, the range of adjustment being in this case 2,000 μμf. owing to the inclusion in the circuit of the four stators VC1, VC2, VC3, and VC4; and the value of the capacity to be measured is read off from column 4 of the drum D, which is calibrated to indicate amounts from 3,000 μμf. to 5,000 μμf.

Between 5,000 μμf. and 7,000 μμf.: the rotor of the switch S is placed in a position (5), in which its fingers are in contact, respectively, with the studs 5, 6, 7, 8, 9, and 19 so that there are connected in circuit, in parallel with the capacity to be measured, all the stators and the rotor of the variable condenser VC and only one, namely C7, of the fixed condensers C3, C4, C5, C6, and C7; the circuit of the coil L2 is as before restored to resonance by means of the knob K, the range of adjustment being 2,000 μμf. as in the last case; and the value of the capacity to be measured is read off from column 5 of the drum D, which is calibrated to indicate amounts from 5,000 μμf. to 7,000 μμf.

Between 7,000 μμf. and 9,000 μμf.: the rotor of the switch S is placed in a position (6), in which its fingers are in contact respectively with the studs 6, 7, 8, 9, 10, and 20 so that there are connected in circuit, in parallel with the capacity to be measured, all the stators and the rotor of the variable condenser VC but none of the fixed condensers C3, C4, C5, C6, and C7; the circuit of the coil L2 is as before restored to resonance by means of the knob K, the range of adjustment being again 2,000 μμf.; and the value of the capacity to be measured is read off from column 6 of the drum D, which is calibrated to indicate amounts from 7,000 μμf. to 9,000 μμf.

Between 9,000 μμf. and 12,500 μμf.: the rotor of the switch S is placed in a position (7), in which its fingers are in contact, respectively, with the studs 7, 8, 9, 10, 11, and 21 so that there are connected in circuit, in parallel with the capacity to be measured, all the stators and the rotor of the variable condenser VC but none of the fixed condensers C3, C4, C5, C6, and C7, and, in series with the capacity to be measured, the fixed condenser C8, which is of a value of 32,000 μμf. so as, in combination in series with a capacity to be measured of 9,000 μμf., to produce a resultant capacity of 7,025 μμf. (approximately) in order with an adjusted capacity of the variable condenser VC in parallel therewith to give the total capacity of 9,000 μμf. which is required for restoring resonance in the case of a minimum capacity to be measured of 9,000 μμf. If, as will usually be the case, the capacity to be measured is greater than 9,000 μμf. resonance is brought about by adjustment by the knob K of the rotor of the variable condenser VC to reduce appropriately the capacity of the latter; and the value of the capacity to be measured is read off from column 7 of the drum D, which is calibrated to indicate amounts from 9,000 μμf. to 12,500 μμf.

Between 12,500 μμf. and 20,000 μμf.: the rotor of the switch S is placed in a position (8), in which its fingers are in contact, respectively, with the studs 8, 9, 10, 11, 12, and 22 so that there are connected in circuit, in parallel with the capacity to be measured, all the stators and the rotor of the variable condenser VC but none of the fixed condensers C3, C4, C5, C6, and C7, and, in series with the capacity to be measured, the fixed condenser C9, which is of a value of 16,000 μμf. so as, in combination in series with a capacity to be measured of 12,500 μμf., to produce a resultant capacity of 7,012 μμf., (approximately) in order with an adjusted capacity of the variable condenser VC in parallel therewith to give the total capacity of 9,000 μμf. required for restoring resonance in the case of a minimum capacity to be measured of 12,500 μμf.; if, as is usually the case, the capacity to be measured is greater than 12,500 μμf. resonance is brought about by adjustment by the knob K of the rotor of the variable condenser VC to reduce the capacity of the latter and the value of the capacity to be measured is read off from column 8 of the drum D, which is calibrated to indicate amounts from 12,500 μμf. to 20,000 μμf.

Between 20,000 μμf. and 50,000 μμf.: the rotor of the switch S is placed in a position (9) in which its fingers are in contact respectively with the studs 9, 10, 11, 12, 13 and 23 so that there are connected in circuit, in parallel with the capacity to be measured, all the stators and the rotor of the variable condenser VC but none of the fixed condensers C3, C4, C5, C6, and C7, and, in series with the capacity to be measured, the fixed condenser C10, which is of a value of 11,000 μμf. so as, in combination in series with a capacity to be measured of 20,000 μμf., to produce a resultant capacity of 7,090 μμf. (approximately) in order with an adjusted capacity of the variable condenser VC to give the total capacity of 9,000 μμf. required for restoring resonance in the case of a minimum capacity to be measured of 20,000 μμf.; if the capacity to be measured is greater than 20,000 μμf. resonance is brought about by adjustment by the knob K of the rotor of the variable condenser VC to reduce the capacity of the latter; and the value of the capacity to be measured is read off from column 9 of the drum D, which is calibrated to indicate amounts from 20,000 μμf. to 50,000 μμf.

Between 50,000 μμf. and 100,000 μμf.: the rotor of the switch S is placed in a position (10) in which its fingers are in contact, respectively, with the studs 10, 11, 12, 13, 14, and 24 so that there are connected in circuit, in parallel with the capacity to be measured, all the stators and the rotor of the variable condenser VC but none of the fixed condensers C3, C4, C5, C6, and C7, and, in series with the capacity to be measured, the fixed condenser C10, which is of a value of 9,100 μμf. so as, in combination in series with a capacity to be measured of 50,000 μμf., to produce a resultant capacity of 7,700 μμf. (approximately) in order with an adjusted capacity of the variable condenser VC to give the total capacity of 9,000 μμf. required for restoring resonance in the case of a minimum capacity to be measured of 50,000 μμf.; if the capacity to be measured is greater than 50,000 μμf. resonance is brought about by adjustment by the knob K of the rotor of the variable condenser VC to reduce the capacity of the latter; and the value of the capacity to be measured is read off from column 9 of the drum D, which is calibrated to indicate amounts from 50,000 μμf. to 100,000 μμf.

The apparatus is enclosed in a small portable case as shown in Figures 1 and 2, and the zero marks on the drum D may readily be set correctly where necessary by aid of the condenser C2, the switch S being in position (1). If desired, the coil L1 may be dispensed with by bringing the coils L and L2 into direct coupling with one another. Further, the numbers of stators and corresponding rotor sections of the variable condenser VC, of the parallel condensers such as C3, C4, C5, C6 and C7 and of the series condensers such as C8, C9, C10 and C11 may be varied or chosen according to requirements or convenience in any particular case.

It will be apparent that in an instrument according to the invention a circuit (equivalent to that of the coil L2 in the case of the instrument just described) with which are connected capacities to be measured, may be restored to resonance with an oscillator in part by an inductance change, instead of, as in the instrument of Figures 1, 2, and 3, solely by capacity change. Thus, as shown in Figure 4 (which is a diagram of the circuit in question above) a coil L41 (equivalent to the coil L2 of Figure 3) has three tappings connected, respectively, with three studs 42, 43, 4 of a switch S41, the moving arm of which is connected with one end of the coil L41 and a fourth stud 41 of the switch S41 being dead. A fixed condenser C41 is connected directly with the other end of the coil L41 and via a switch S42 with the first-mentioned end of said coil L41; and a variable condenser C42 is connected directly across the coil L41; whilst terminals T41, T42, with which a capacity to be measured is connected, are connected, respectively, with the ends of the coil L41.

In this arrangement, for the lowest range of readings, the moving arm of the switch S41 is on the stud 41 and the switch S42 is closed, and, with no capacity to be measured, connected to the terminals T41 and T42, and the condenser C42 (bearing the indicating scale, not shown) substantially at maximum, the circuit is in resonance with an oscillator (not shown); the whole of the coil L41 and the condenser C41 being in circuit.

For the next range of capacity readings, the switch S42 is opened, thus leaving out of circuit the condenser C41.

For the next range of readings, the moving arm of the switch S41 is shifted to the stud 42 so removing from circuit the lowermost section of the coil L41.

For the remaining two ranges, the arm of the switch S41 is shifted to the stud 43 and the stud 44, respectively.

There are thus five ranges in all, three of which are determined by inductance changes.

Figure 5 is a diagram of that circuit of a single range instrument which is brought to resonance with an oscillator (not shown) to indicate capacity values. As shown, a coil L51 has terminals T51 and T52, for connection with a capacity to be tested, connected with the ends thereof and a condenser C51 connected across it, thus giving a single range only of capacity measurements.

Although it has been thought unnecessary to give an example, it will be apparent to those skilled in the art that variation of a capacity connected in series with a capacity to be measured, may be used, instead of variation of a capacity in parallel with that to be measured, to restore resonance after a capacity to be measured has been connected.

Any known or convenient type of thermionic valve may be employed in the oscillator of an instrument according to the invention; and, it is to be observed that in such instruments the frequency at which the capacity values of condensers are measured may be of the same order as those at which such condensers are intended to be used. Very small capacities can readily be measured with great accuracy, which is of importance in connection with radio or similar apparatus, and especially with such apparatus intended for short wave or high frequency working.

What I claim to be new is:

1. In a capacity measuring instrument, an inductance coil adapted to be inductively coupled to an oscillator, a variable condenser having a plurality of stators and a rotor common to said stators, said rotor being connected to one terminal of the inductance coil, a switch having a plurality of contacts and blades, means connecting each of said stators to certain of said contacts, a pair of terminals adapted to be bridged by a capacity to be measured, a fixed capacity connected between certain of said other switch contacts and one of the inductance coil terminals, means connecting the switch blade with the other of the inductance coil terminals, and a fixed capacity connected between one of said last mentioned terminals and certain of said other contacts, said other of said last mentioned terminals being connected to a terminal of the inductance coil, said switch being adjustable for connecting certain of the stators of the variable condenser in parallel with the inductance coil and said switch being also adjustable for connecting said first mentioned fixed capacity in parallel with the inductance coil, said switch being further adjustable for connecting said last mentioned fixed capacity in series with a capacity to be measured and across the inductance coil, all of said switch adjustments permitting ascertainment of the capacity to be measured.

2. A capacity measuring instrument including, in combination with an oscillator, an inductance coil, means inductively connecting the oscillator with the inductance coil, a variable condenser having a plurality of stators and a common rotor, means connecting the rotor to one terminal of the inductance coil, a switch having a plurality of contacts and blades, each of said stators being connected to certain of said contacts and said blades being connected to a terminal of the inductance coil, said switch being adjustable for progressively connecting said stators in parallel with the inductance coil, a plurality of fixed capacities having corresponding terminals connected with one terminal of the inductance coil, the other corresponding terminals of said fixed capacities to certain of said other contacts on the switch, a pair of terminals adapted to be bridged by a capacity to be measured, a plurality of fixed capacities connected between one of said last mentioned terminals and certain other contacts on the switch, and means connecting the other of said last mentioned terminals with a terminal of the inductance coil, said switch being further adjustable for either connecting said first mentioned fixed capacities in parallel with the inductance coil or connecting the second mentioned series of fixed capacities selectively in series with the capacity to be measured and the inductance coil, said capacities and switch permitting the inductance coil to be brought into resonance with the oscillator for imposition of the capacity to be measured whereby said capacity to be measured may be ascertained.

3. In a capacity measuring instrument, an inductance coil adapted to be inductively coupled with an oscillator, a variable condenser having a stator and a rotor, a switch having a plurality of contacts and a blade, said rotor being connected to a terminal of the inductance coil and said stator being connected to certain of said contacts, a fixed capacity having a terminal connected with the inductance coil, the other terminal of said fixed capacity being connected to certain other of said contacts, a pair of terminals adapted to be bridged by a capacity the value of which is to be measured, a second fixed capacity having a terminal connected with one of said last mentioned terminals, the other of said terminals being connected with certain other of said switch contacts, means connecting the blade with the other terminal of the inductance coil, and means connecting the other of said terminals to be bridged by the capacity to be measured to the first mentioned terminal of the inductance coil, said switch blade being adjustable for connecting said variable condenser in parallel with the inductance coil, said switch being further adjustable for connecting said first mentioned fixed capacity in parallel with the inductance coil and said switch being further adjustable for connecting said last mentioned fixed capacity in series with the capacity to be measured and the inductance coil and simultaneously connecting the variable condenser in parallel with the inductance coil, said capacities being adapted to tune the inductance coil in resonance with the oscillator on the imposition of the capacity to be measured whereby the value of said capacity may be found, and means carried by the variable condenser for indicating the capacity of the capacity to be measured.

4. A device of the class described including, in combination with an oscillator, an inductance coil, means inductively coupling the inductance coil to the oscillator, a variable condenser having a stator and rotor, a switch having a plurality of contacts and a blade, said rotor being connected to one terminal of the inductance coil and said stator being connected to one of the switch terminals, a fixed capacity connected between the other terminal of the inductance coil and another of the switch contacts, means connecting the switch blade with the second mentioned terminal of the inductance coil, a second fixed capacity, a pair of terminals adapted to be bridged by a capacity the value of which is to be measured, means connecting the second fixed capacity between one of said last mentioned terminals and certain of the switch contacts, and means connecting the other of said last mentioned terminals with the first mentioned inductance coil terminal, said switch being adjustable for connecting the variable condenser in parallel with the inductance coil and simultaneously connecting said first mentioned fixed capacity in parallel with the variable condenser and inductance coil, said switch being further adjustable for connecting the variable condenser in parallel with the inductance coil and simultaneously connecting the second fixed capacity in series with the capacity the value of which is to be measured and the inductance coil for permitting the capacity of said capacity to be measured to be ascertained upon the tuning of the inductance coil into resonance with the oscillator.

5. In a capacity measuring instrument, an inductance coil, a variable condenser, a switch having a plurality of contacts and a blade, said blade being connected to one terminal of the inductance coil and certain of said contacts being connected to the stator whereby said switch will be adapted for connecting the condenser in parallel with the coil, a pair of terminals adapted to be bridged by a capacity the value of which is to be measured, and a fixed capacity connected with one of said last mentioned terminals and certain of the switch contacts, said other of said last mentioned terminals being connected with said inductance coil, said switch being adjustable for connecting said fixed capacity in series with the capacity to be measured and with the inductance coil, said switch being further adjustable for connecting said capacity to be measured in parallel with the variable condenser and the inductance coil whereupon the capacity may be ascertained upon tuning the inductance coil into resonance with an oscillator.

6. A device of the class described including an oscillator having an inductance coil, a second inductance coil, means inductively coupling the inductance coils, a variable condenser having a plurality of stators and a common rotor, a switch having a plurality of contacts and a blade, said blade being connected to one terminal of the second inductance coil, the rotor of the variable condenser being connected to the other terminal of said second inductance coil, said stators being connected to certain of said contacts, a pair of terminals adapted to be bridged by a capacity to be measured, means connecting one of said last mentioned terminals with the second inductance coil, means connecting the other of said last mentioned terminals with certain of the contacts, a plurality of fixed capacities having corresponding terminals connected with said second mentioned terminal of said last mentioned pair of terminals, a second set of fixed capacities, means connecting corresponding terminals of said second set of fixed capacities to the first mentioned terminal of the second inductance coil, and means connecting the remaining corresponding terminals of said second set of fixed contacts to certain of the switch contacts, said switch being adjustable for connecting portions or all of the variable condenser in parallel with the inductance coil, said switch being further adjustable for connecting the capacity the value of which is to be measured in series with the first set of fixed capacities and across the second inductance coil or in parallel with the capacities of said second set of fixed capacities and the second inductance coil.

LEONARD ARTHUR SHARLAND.